United States Patent
Koo et al.

(10) Patent No.: US 7,274,947 B2
(45) Date of Patent: Sep. 25, 2007

(54) BIAS ERROR COMPENSATED INITIAL TRANSMISSION POWER CONTROL FOR DATA SERVICES

(75) Inventors: Chang-Soo Koo, Northport, NY (US); Sudheer A. Grandhi, White Plains, NY (US); James M. Miller, Verona, NJ (US); Sung-Hyuk Shin, Fort Lee, NJ (US)

(73) Assignee: InterDigital Technology Corporation, Wilmington, DE (US)

(*) Notice: Subject to any disclaimer, the term of this patent is extended or adjusted under 35 U.S.C. 154(b) by 581 days.

(21) Appl. No.: 10/721,482

(22) Filed: Nov. 25, 2003

(65) Prior Publication Data
US 2004/0106426 A1  Jun. 3, 2004

Related U.S. Application Data

(60) Provisional application No. 60/429,885, filed on Nov. 26, 2002.

(51) Int. Cl.
*H04B 1/00* (2006.01)
*H04B 7/00* (2006.01)

(52) U.S. Cl. ............... 455/522; 455/69; 455/67.11; 455/68

(58) Field of Classification Search ............... 455/69, 455/522, 450, 507, 509, 511, 515, 517, 67.11, 455/67.13, 68, 452.2, 67.16; 370/320, 470, 370/252, 328, 329, 341
See application file for complete search history.

(56) References Cited

U.S. PATENT DOCUMENTS 6,396,804 B2  5/2002  Odenwalder

| | | | |
|---|---|---|---|
| 2002/0128031 A1* | 9/2002 | Valkealahti | 455/522 |
| 2002/0196879 A1* | 12/2002 | Iochi | 375/346 |
| 2003/0144019 A1* | 7/2003 | Nelson et al. | 455/522 |
| 2004/0047305 A1* | 3/2004 | Ulupinar | 370/320 |

FOREIGN PATENT DOCUMENTS

EP  1077531  2/2001

OTHER PUBLICATIONS

U.S. Appl. No. 20020196879 A1; Iochi; Dec. 26, 2002.
U.S. Appl. No. 20040022228 A1; Tyra et al.; Feb. 5, 2004.
U.S. Appl. No. 20040047305 A1; Ulupinar, Mar. 11, 2004.

* cited by examiner

*Primary Examiner*—Edward F. Urban
*Assistant Examiner*—John J. Lee
(74) *Attorney, Agent, or Firm*—Volpe and Koenig, P.C.

(57) ABSTRACT

A method, components and a system are provided for implementing power control for wireless communication transmissions that provides, inter alia, a remedy for the mismatch of initial transmission power for NRT data by estimating a bias error based and adjusting the transmission power by a compensation amount for an averaged bias error estimation over all data set transmissions, such as sequential Temp-DCH allocations in a UMTS system. An alternative approach for a UMTS system estimates the bias error at a RNC based on an averaged transmit code power measurement by a base station and applies a bias error compensation to the initial DL transmit power at the RNC.

28 Claims, 5 Drawing Sheets

BIAS ERROR COMPENSATED INITIAL TRANSMISSION POWER CONTROL FOR DATA SERVICES

CROSS REFERENCE TO RELATED APPLICATION(S)

This application claims priority from U.S. provisional application No. 60/429,885, filed Nov. 26, 2002, which is incorporated by reference as if fully set forth.

FIELD OF INVENTION

The invention generally relates to wireless communication systems. In particular, the invention relates to power control in such systems.

BACKGROUND

The terms base station, wireless transmit/receive unit (WTRU) and mobile unit are used in their general sense. As used herein, a wireless transmit/receive unit (WTRU) includes, but is not limited to, a user equipment, mobile station fixed or mobile subscriber unit, pager, or any other type of device capable of operating in a wireless environment. WTRUs include personal communication devices, such as phones, video phones, and Internet ready phones that have network connections. In addition, WTRUs include portable personal computing devices, such as PDAs and notebook computers with wireless modems that have similar network capabilities. WTRUs that are portable or can otherwise change location are referred to as mobile units. When referred to hereafter, a base station is a WTRU that includes, but is not limited to, a base station, Node B, site controller, access point, or other interfacing device in a wireless environment.

Wireless telecommunication systems are well known in the art. In order to provide global connectivity for wireless systems, standards have been developed and are being implemented. One current standard in widespread use is known as Global System for Mobile Telecommunications (GSM). This is considered as a so-called Second Generation mobile radio system standard (2G) and was followed by its revision (2.5G). GPRS and EDGE are examples of 2.5G technologies that offer relatively high speed data service on top of (2G) GSM networks. Each one of these standards sought to improve upon the prior standard with additional features and enhancements. In January 1998, the European Telecommunications Standard Institute—Special Mobile Group (ETSI SMG) agreed on a radio access scheme for Third Generation Radio Systems called Universal Mobile Telecommunications Systems (UMTS). To further implement the UMTS standard, the Third Generation Partnership Project (3GPP) was formed in December 1998. 3GPP continues to work on a common third generational mobile radio standard.

Figure 1:
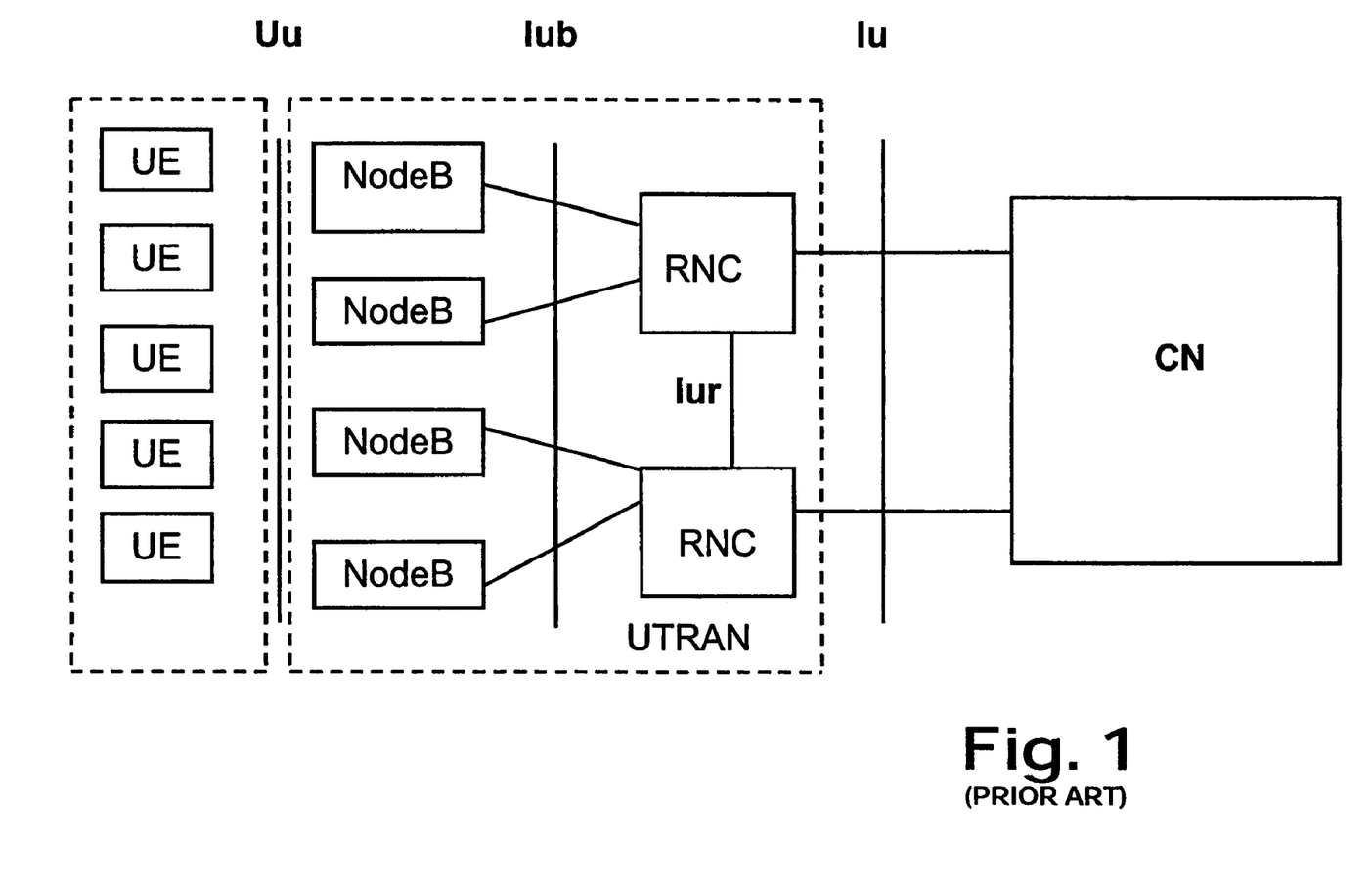
FIG. 1 shows an overview of a system architecture of a conventional UMTS network.

A typical UMTS system architecture in accordance with current 3GPP specifications is depicted in FIG. 1. The UMTS network architecture includes a Core Network (CN) interconnected with a UMTS Terrestrial Radio Access Network (UTRAN) via an interface known as Iu which is defined in detail in the current publicly available 3GPP specification documents. The UTRAN is configured to provide wireless telecommunication services to users through wireless transmit receive units (WTRUs), shown as user equipments (UEs) as in 3GPP, via a radio interface known as Uu. The UTRAN has one or more radio network controllers (RNCs) and base stations, shown as Node Bs as in 3GPP, which collectively provide for the geographic coverage for wireless communications with UEs. One or more Node Bs is connected to each RNC via an interface known as Iub in 3GPP. The UTRAN may have several groups of Node Bs connected to different RNCs; two are shown in the example depicted in FIG. 1. Where more than one RNC is provided in a UTRAN, inter-RNC communication is performed via an Iur interface.

Communications external to the network components are performed by the Node Bs on a user level via the Uu interface and the CN on a network level via various CN connections to external systems.

In general, the primary function of base stations, such as Node Bs, is to provide a radio connection between the base stations' network and the WTRUs. Typically a base station emits common channel signals allowing non-connected WTRUs to become synchronized with the base station's timing. In 3GPP, a Node B performs the physical radio connection with the UEs. The Node B receives signals over the Iub interface from the RNC that control the radio signals transmitted by the Node B over the Uu interface.

A CN is responsible for routing information to its correct destination. For example, the CN may route voice traffic from a UE that is received by the UMTS via one of the Node Bs to a public switched telephone network (PSTN) or packet data destined for the Internet.

The RNCs generally control internal functions of the UTRAN. The RNCs also provides intermediary services for communications having a local component via a Uu interface connection with a Node B and an external service component via a connection between the CN and an external system, for example overseas calls made from a cell phone in a domestic UMTS.

Typically an RNC oversees multiple base stations, manages radio resources within the geographic area of wireless radio service coverage serviced by the Node Bs and controls the physical radio resources for the Uu interface. In 3GPP, the Iu interface of an RNC provides two connections to the CN: one to a packet switched domain and the other to a circuit switched domain. Other important functions of the RNCs include confidentiality and integrity protection.

In many wireless communication systems, adaptive transmission power control algorithms are used. In such systems, many communications may share the same radio frequency spectrum. When receiving a specific communication, all the other communications using the same spectrum cause interference to the specific communication. As a result, increasing the transmission power level of one communication degrades the signal quality of all other communications within that spectrum. However, reducing the transmission power level too far results in undesirable received signal quality, such as measured by signal to interference ratios (SIRs) at the receivers. In 3GPP W-CDMA systems, power control is used as a link adaptation method. Dynamic power control is applied for dedicated physical channels (DPCH), such that the transmit power of the DPCHs is adjusted to achieve a quality of service (QoS) with a minimum transmit power level, thus limiting the interference level within the system.

One approach is to divide transmission power control into separate processes, referred to as outer loop power control (OLPC) and inner loop power control (ILPC). Basically, the power level of a specific transmitter is based on a target SIR value. In outer loop power control, as a receiver receives the transmissions, the quality of the received signal is measured. The transmitted information is sent in units of transport blocks (TBs), and the received signal quality can be monitored on a block error rate (BLER) basis. The BLER is estimated by the receiver, typically by a cyclic redundancy check (CRC) of the data. This estimated BLER is compared to a target quality requirement, such a target BLER, representative of QoS requirements for the various types of data services on the channel. Based on the measured received signal quality, a target SIR adjustment control signal is generated In 3GPP wideband code division multiple access (W-CDMA) systems utilizing time division duplex (TDD) mode, the UTRAN (SRNC-RRC) sets the initial target SIR to the WTRU at the call/session establishment and then subsequently continuously adjusts the target SIR of the WTRU during the life term of the call as dictated by the observation of the uplink (UL) BLER measurement.

In closed inner loop power control, the receiver compares a measurement of the received signal quality, such as SIR, to a threshold value. If the SIR exceeds the threshold, a transmit power control (TPC) command to decrease the power level is sent. If the SIR is below the threshold, a TPC command to increase the power level is sent. Typically, the TPC command is +1 or −1 bit multiplexed with data in a dedicated channel to the transmitter. In response to received TPC bits, the transmitter changes its transmission power level.

Also, a wireless channel can transmit a variety of services, such as video, voice, and data, each having different QoS requirements. The transmission rate unit is a transmission time interval (TTI). The smallest interval is one frame of data, typically defined as 10 ms for a 3GPP-like communication system. In a 3GPP-like system, TTIs are in lengths of 10, 20, 40, or 80 ms. For non-real time (NRT) data services, data is transmitted in many bursts or data sets of short duration. In a 3GPP system for example, one option is to map the data as a number of transport blocks onto a group of DPCHs which are temporarily assigned to a user by signaling an activation time and an end time with the DPCH allocation. The end time can be either explicitly signaled or can be implicitly signaled by the inclusion of a duration parameter. This temporary assignment can be called a temporary dedicated channel (Temp-DCH). This mapping is also referred to in terms of Temp-DCH allocations. One or more transport blocks are mapped onto the channel per TTI. Thus, each service is mapped across several TTIs, while target SIR adjustments are made on a TTI basis during OLPC for the Temp-DCH allocations.

During transmission of data services according to Temp-DCH allocations, a controlling RNC (CRNC) calculates initial downlink (DL) transmission power based on the target BLER, the primary common control physical channel (PCCPCH) received signal code power (RSCP), and the DL timeslot interference signal code power (ISCP) information received from the serving RNC (SRNC) and sends it to the base station. However, a mismatch typically exists between the initial transmission power and the required transmission power due to systematic and measurement bias errors. The systematic errors are related to the base station transmitter and WTRU receiver analog gain control. Measurement error occurs in the above-mentioned measured quantities. The mismatch will produce an excessive or insufficient transmission power in the beginning of each Temp-DCH allocation until the inner loop power control (ILPC) corrects these bias errors. System capacity is degraded by signal interference resulting from improper initial transmission power.

SUMMARY

A method, components and a system are provided for implementing power control for wireless communication transmissions that provides, inter alia, a remedy for the mismatch of initial transmission power for NRT data by estimating a bias error based and adjusting the transmission power by a compensation amount for an averaged bias error estimation over all data set transmissions, such as sequential Temp-DCH allocations in a UMTS system. An alternative approach for a UMTS system estimates the bias error at a RNC based on an averaged transmit code power measurement by a base station and applies a bias error compensation to the initial DL transmit power at the RNC.

A method of transmission power control for a transmitting wireless transmit receive unit (WTRU) that transmits successive data sets in a forward channel where the transmitting WTRU is configured to make forward channel power adjustments as a function of characteristics of the data sets as received over the forward channel is provided. Successive data sets transmitted from the transmitting WTRU on the forward channel are sequentially received by a receiving WTRU. Transmit power control signals are successively computed for the transmitting WTRU's forward channel power adjustments based on the characteristics of each of the data sets received on the forward channel. Bias error values are successively computed based on the cumulative characteristics of the data set signals received on the forward channel. Then, in advance of each successive data set after the transmission of a first data set, forward channel power is adjusted as a function of the most recently computed transmit power control signal and most recently computed bias error value.

Preferably, the transmitting WTRU is a network unit that transmits data sets on a downlink channel and the computing of transmit power control signals is performed by the receiving WTRU. Alternatively, the transmitting WTRU transmits user signals on an uplink channel and the computing of transmit power control signals is performed by a network unit that receives the uplink channel. Either the transmitting WTRU or the receiving WTRU can compute the bias error values.

Closed loop transmission power control for the transmitting WTRU is preferably implemented where the transmit power control signals are computed by the receiving WTRU by producing power step commands as a function of computed target Signal to Interference Ratios (SIRs). The power step commands are transmitted on a reverse channel by the receiving WTRU; and received by the transmitting WTRU on the reverse channel. The method is preferably implemented in a Universal Mobile Telecommunications System (UMTS) where the transmitting WTRU is configured as Node B and the receiving WTRU is configured as a mobile User Equipment (UE).

Receiving and transmitting WTRUs of a wireless communication system for implementing transmission power control for transmitting WTRUs that transmit successive data sets in forward channels where the transmitting WTRUs are configured to make forward channel power adjustments as a function of characteristics of the data sets as received over the forward channel are provided. A preferred receiving WTRU has a receiver configured to sequentially receive successive data sets transmitted from the transmitting WTRU on the forward channel. The receiving WTRU includes a processor configured to successively compute transmit power control signals for the transmitting WTRU's forward channel power adjustments based on the characteristics of each of the data sets received on the forward channel and a transmitter configured to transmit on a reverse channel the transmit power control signals for the transmitting WTRU's forward channel power adjustments.

A preferred transmitting WTRU has a transmitter configured to transmit successive data sets in a forward channel. A processor is associated with the transmitter configured to make forward channel power adjustments as a function of characteristics of the data sets as received over the forward channel. The transmitting WTRU also has a receiver configured to successively receive on a reverse channel successively computed transmit power control signals for the transmitting WTRU's forward channel power adjustments based on the characteristics of each of the data sets received on the forward channel and successively computed bias error values based on the cumulative characteristics of the data set signals received on the forward channel.

Either the transmitting WTRU's processor or the receiving WTRU's processor is configured to successively compute a bias error value based on the cumulative characteristics of the data set signals received on the forward channel. The transmitting WTRU's processor is configured to adjust forward channel power as a function of the most recently received transmit power control signal and most recently computed or received bias error value in advance of the transmission of each successive data set after the transmission of a first data set.

Preferably, closed loop transmission power control is implemented for the transmitting WTRU where the receiving WTRU is configured to compute the transmit power control signals by producing power step commands as a function of computed target Signal to Interference Ratios (SIRs). The wireless communication system is advantageously configured as a Universal Mobile Telecommunications System (UMTS) where the transmitting WTRU is configured as a Node B and the receiving WTRU is configured as a User Equipment (UE). In such case, the Node B transmitter is configured to transmit the data signal sets on a down link channel, the Node B receiver is configured to receive the power step commands on an uplink channel, the UE receiver is configured to receive the data signal sets on the down link channel and the UE transmitter is configured to transmit the power step commands on the uplink channel.

Other objects and advantages will be apparent to those of ordinary skill in the art based upon the following description of presently preferred embodiments of the invention.

DETAILED DESCRIPTION OF THE PREFERRED EMBODIMENT(S)

Although the embodiments are described in conjunction with a third generation partnership program (3GPP) wideband code division multiple access (W-CDMA) system utilizing the time division duplex mode, the embodiments are applicable to any hybrid code division multiple access (CDMA)/time division multiple access (TDMA) communication system. Additionally, the embodiments are applicable to CDMA systems, in general, such as the proposed frequency division duplex (FDD) mode of 3GPP W-CDMA.

Figure 6:
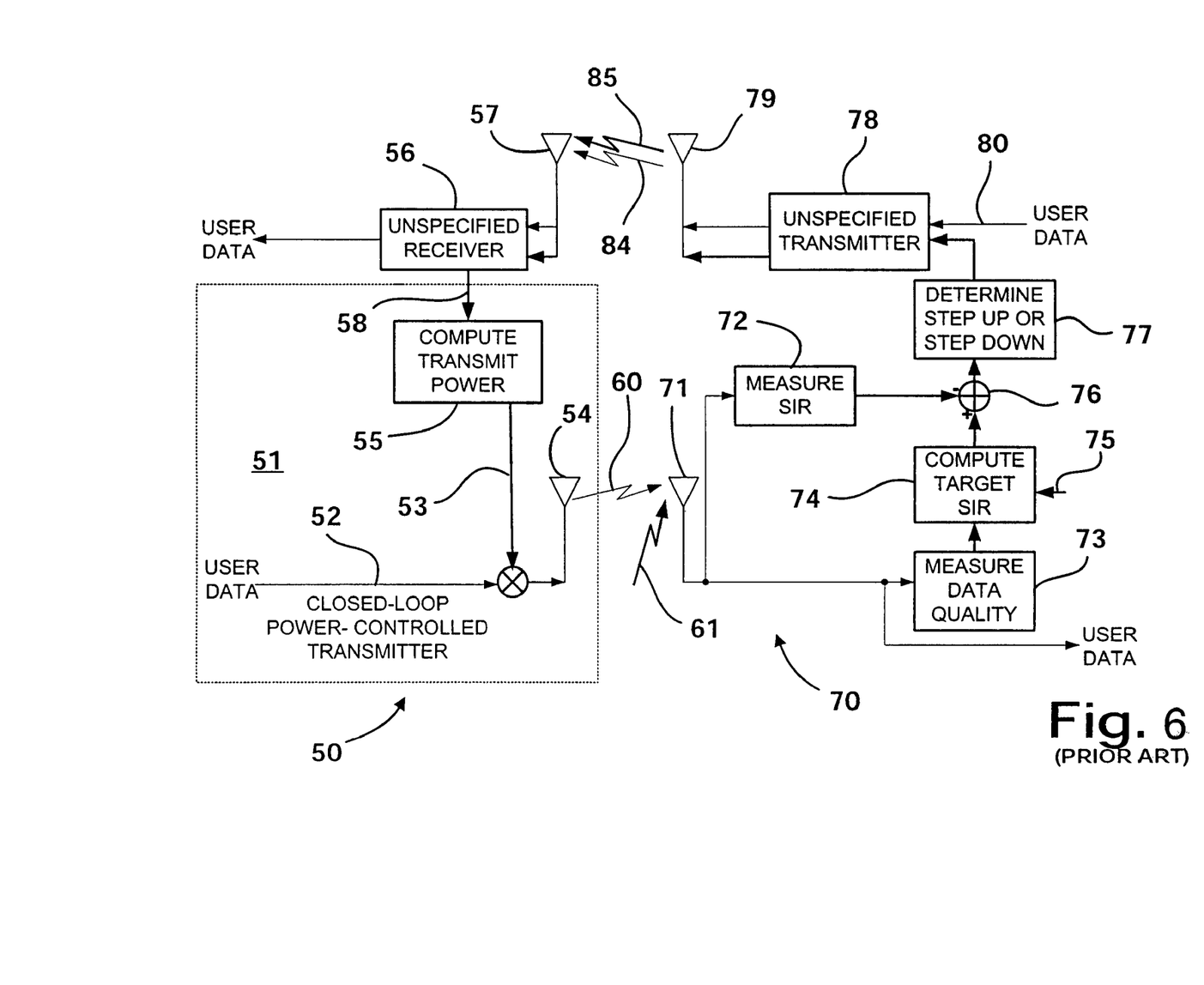
FIG. 6 shows a block diagram of a transmitting station and a receiving station configured to perform inner loop power control.

FIG. 6 shows a communication system having a transmitting station 50 and a receiving station 70 which employs a closed loop power control system is illustrated. The transmitting station 50 includes a transmitter 51 having a data line 52 which transports a user data signal for transmission. The user data signal is provided with a desired power level which is adjusted by applying a transmit power adjustment from an output 53 of a processor 55 to adjust the power level. The user data is transmitted via an antenna system 54 of the transmitter 51.

A wireless radio signal 60 containing the transmitted data is received by the receiving station 70 via a receiving antenna system 71. The receiving antenna system will also receive interfering radio signals 61 which impact on the quality of the received data. The receiving station 70 includes an interference power measuring device 72 to which the received signal is input which device 72 outputs measured SIR data. The receiving station 70 also includes a data quality measuring device 73 into which the received signal is also input which device 73 produces a data quality signal. The data quality measuring device 73 is coupled with a processor 74 which receives the signal quality data and computes target signal to interference ratio (SIR) data based upon a user defined quality standard parameter received through an input 75.

A combiner 76, preferably a subtracter, compares the measured SIR data from the device 72 with the computed target SIR data from the processor 74, preferably by subtracting, to output an SIR error signal. The SIR error signal from the combiner 76 is input to processing circuitry 77 which generates step up/down commands based thereon.

The receiving station 70 also includes a transmitter 78 which is coupled with the processing circuitry 77. The receiving station's transmitter 78 also includes an input 80 for user data. The receiving station 70 transmits its user data and the control related data via an associate antenna system 79.

The transmitting station 50 includes a receiver 56 and an associated receiving antenna system 57. The transmitting station's receiver 56 receives the radio signal transmitted from the receiving station 70 which includes the receiving station's user data 84 and the control data 85 generated by the receiving station.

The transmitting station's transmitter's processor 55 has an input 58 associated with the transmitting station's receiver 16. The processor 55 receives the up/down command signal through input 58 and computes the transmit power adjustments based thereon.

With respect to the inner loop of the closed loop power control system, the transmitting station's transmitter 51 sets its power based upon high-rate "step-up" and "step-down" commands generated by the remote receiving station 70. At the remote receiving station 70, the SIR of the received data is measured by the measuring device 72 and compared with a target SIR value generated by the processor 74 via combiner 76. The target SIR is that value (in theory) which, given that the data is received with that value, results in a desired quality of service. If the measured received SIR is less than the target SIR, a "step-down" command is issued by the processing circuitry 77, via the receiving station's transmitter 78 and the transmitting station's receiver 56, to the transmitter 51, otherwise a "step-up" command is issued. The power control system is considered "closed-loop" because of the high-rate feedback of the "step-up" and "step-down" commands which can react in real time to the time-varying propagation channel and interference. If required transmit power level changes due to time varying interference and propagation, it quickly responds and adjusts transmit power accordingly.

With respect to the outer loop of the closed loop power control system, the quality of the received data is evaluated in the receiving station 70 by the measuring device 73. Typical metrics for digital data quality are bit error rate and block error rate (BLER). Computation of these metrics requires data accumulated over periods of time significantly longer than the period of the time-varying propagation channel and interference. For any given metric, there exists a theoretical relationship between the metric and received SIR. When enough data has been accumulated in the remote receiver to evaluate the metric, it is computed and compared with the desired metric (representing a desired quality of service) by the processor 74 and an updated target SIR is then output. The updated target SIR is that value (in theory) which applied in the receiver algorithm would cause the measured metric to converge to the desired value. The updated target SIR is then used in the inner loop to determine the direction of the step up/down commands sent to the transmitting station's power scale generating processor 55 to control the power of the transmitter 51.

In both open and closed power control systems, outer-loop functionality for the transmitting station 50 relies on observations of received transmissions by the receiving station 30, 70 such as observing block-error rates (BLER) or received SIRs. If for example the observed BLER becomes higher than allowed, such as observed BLER>0.1 for target BLER=10% in 3GPP R5, and the user data becomes unusable because of too many errors, a higher target SIR is computed that causes the transmitting station 50 in turn to adjust its transmit power.

The preferred embodiment is a method for eliminating mismatch between an initial transmission power and the required transmission power. The initial DL transmission power setting from the serving RNC to the base station is represented by the following general equation:

$$P_{init}^{DL} = (P_{PCCPCH}^{tx} - P_{PCCPCH}^{rec}) + ISCP_{TS\#k}^{DL} + SIR^{DL} + \text{CONSTANT} \quad \text{Equation 1}$$

where:
$P_{PCCPCH}^{tx}$ is the transmitted power of the PCCPCH at the base station (in dBm)
$P_{PCCPCH}^{rec}$ is the PCCPCH RSCP measured by the WTRU (in dBm)
$ISCP_{TS\#k}^{DL}$ is the ISCP of timeslot k (the first DL timeslot of the CCTrCH) (in dBm)
$SIR^{DL}$ is the target SIR selected from the look-up table based on the target BLER(s) of the CCTrCH (in dB)
CONSTANT is the DPCH constant value for the cell, provided to the cell in CELL SETUP REQUEST and broadcast to all WTRUs in system information blocks (in dB).

Figure 2:
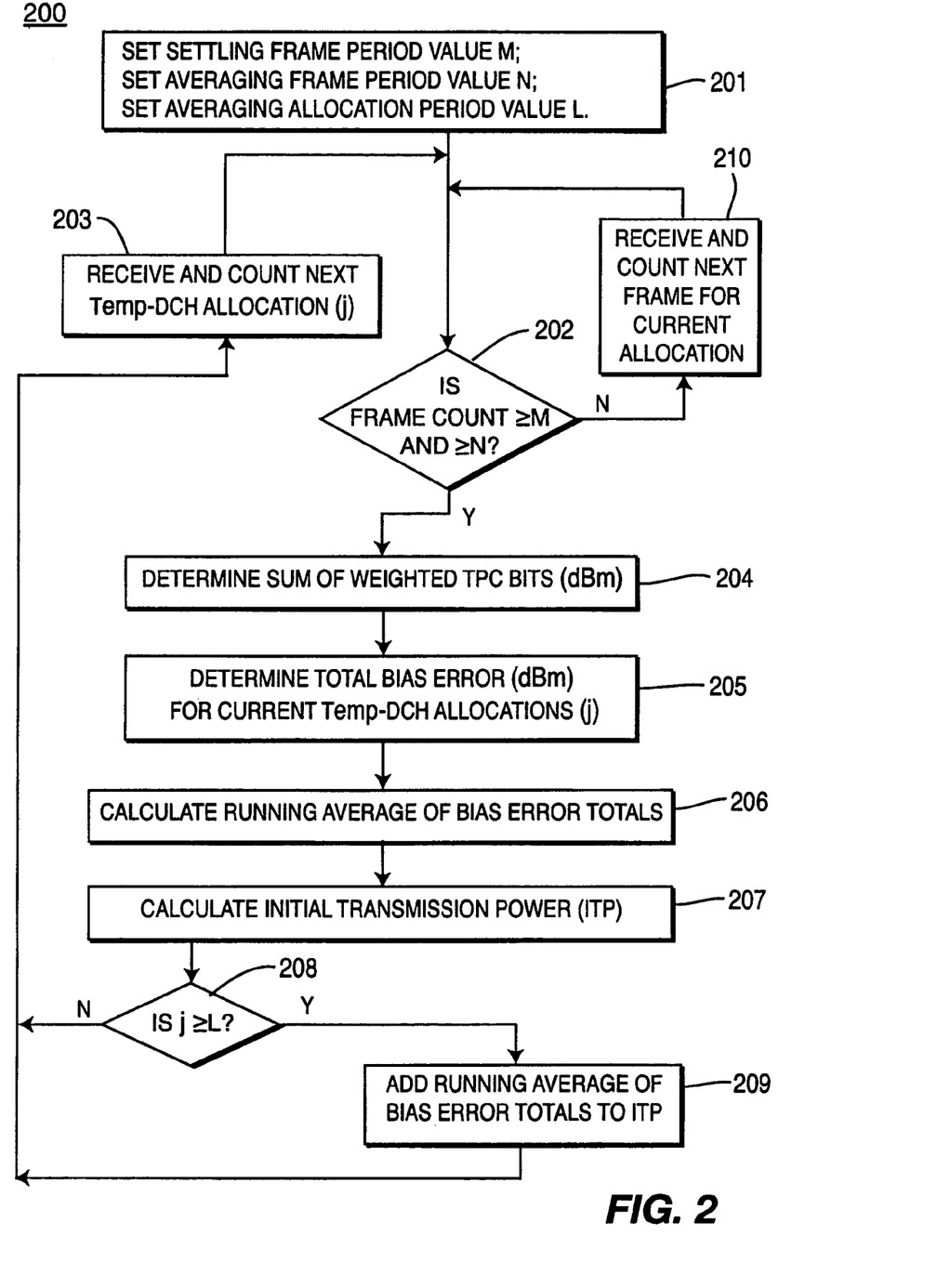
FIG. 2 shows a method flowchart for bias error compensated initial transmission power control for data services.

FIG. 2 shows a method flowchart for method 200, which performs initial transmission power control for data services with bias error compensation. In step 201, method parameters are initialized, including an observation period of j Temp-DCH allocations, a minimum number of M frames necessary for an initial settling time for bias error compensation, and averaging period of N frames for the number of measurements to estimate the fading channel. The preferred initialized values are j=0, M=10, and N=10. Alternatively, other values for settling period M and averaging period N may be used for optimized results depending on system parameters.

Next in steps 202 and 210, the observation period is monitored to ensure that enough frames have elapsed to satisfy the settling period of M frames and averaging period of N frames. Once these periods are satisfied, step 204 commences to determine the sum of weighted TPC command bits within a single Temp-DCH allocation as follows:

$$SumTPC_k = \sum_{i=1}^{k} TPCbit_i * StepSize_i \quad \text{Equation 2}$$

where value TPCbit is the TPC command bit (i.e., +1 or −1), value StepSize is the increment in dB that the transmit power is adjusted either upward or downward according to the value of the TPC command, and the index i is the $i^{th}$ frame number within each Temp-DCH allocation, where the operation of inner loop power control is assumed per frame. This calculation allows for the determination of the total power adjustment that needs to be made from the beginning of the transmission (initial transmit power), until the completion of the Temp-DCH allocation.

With the weighted sum of TPC bit values known, a total bias error value $BE_{TOTAL}$ for the $j^{th}$ Temp-DCH allocation is determined in step 205 according to Equations 3 and 4:

$$BE_{TOTAL}(j) = 10 * \log_{10}\left(\frac{1}{N} * \left(\sum_{k=M+1}^{M+N} A_k\right)\right) \quad \text{Equation 3}$$

where $$A_k = 10^{SumTPC_k/10} \quad \text{Equation 4}$$

and k is the $k^{th}$ frame within the $j^{th}$ Temp-DCH allocation.

The average total bias error value $BE_{TOTAL\_AVG}$ is applied to the initial DL transmission power from the $L^{th}$ Temp-DCH allocation, where threshold L is a predetermined operating parameter chosen by the operator to optimize performance. The total bias error value $BE_{TOTAL}$ is averaged in step 206 for all j Temp-DCH allocations as follows:

For j<L, $$BE_{TOTAL\_AVG}(j) = \{(j-1)BE_{TOTAL\_AVG}(j-1) + (BE_{TOTAL}(j)\}/j \quad \text{Equation 5a}$$

For j≧L, $$BE_{TOTAL\_AVG}(j) = BE_{TOTAL\_AVG}(j-1) + (BE_{TOTAL}(j)/j) \quad \text{Equation 5b}$$

where $BE_{TOTAL\_AVG}(0)=0$, which would occur for the first iteration of method 200 when j=1, and j−1=0.

In step 207, the initial transmission power is calculated according to Equation 6 (which is based on Equation 1):

$$P_{init}^{DL,1}(j) = (P_{PCCPCH}^{tx} - P_{PCCPCH}^{rec}) + ISCP_{TS\#k}^{DL} + SIR^{DL} + \text{CONSTANT} \quad \text{Equation 6}$$

In step 208, the number of j allocations is checked against the averaging period L. If the current $j^{th}$ allocation has reached or exceeded period L (i.e., $j \geq L$), then value $BE_{TOTAL\_AVG}$ is applied in step 209 to the second and later Temp-DCH allocations as compensation to the initial DL transmission power from the $L^{th}$ Temp-DCH allocation, and the resultant initial transmission power value is then as follows:

$$P_{init}^{DL,1}(j) = (P_{PCCPCH}^{tx} - P_{PCCPCH}^{rec}) + ISCP_{TS\#k}^{DL} + SIR^{DL} + CONSTANT + BE_{TOTAL\_AVE}(j-1)$$ Equation 7

If at step 208, the averaging period L has not been met, then the initial transmission power calculated at step 207 is left as is, without bias error compensation.

Method 200 continues by returning to step 203 where the next Temp-DCH allocation is received, and the number of frames are counted and compared to observation period values M and N. The sum of weighted TPC bits of step 204 and the total bias error of step 205 are repeated for the current Temp-DCH allocation as before. Next, the running average of total bias error in step 206 now includes the total bias error of the prior Temp-DCH allocation (i.e., for j−1) and that of the current Temp-DCH allocation (i.e., for j). With each iteration, this step 206 average calculation will include the estimated total bias error for each Temp-DCH allocation determined in step 205. Hence, with each iteration, the initial transmission power calculation of steps 207 and 209 will improve with greater precision as the mismatch between the calculated initial value and the required initial transmission power value will be eliminated due the compensation based on the dynamic adjustment to historical bias errors. Method 200 repeats for the duration of the channel transmission on the monitored CCTrCH.

In alternative embodiments, the settling period M and averaging period N can be optimized with respect to fading conditions and the frequency of operation of inner loop power control to obtain improved performance.

Figure 3:
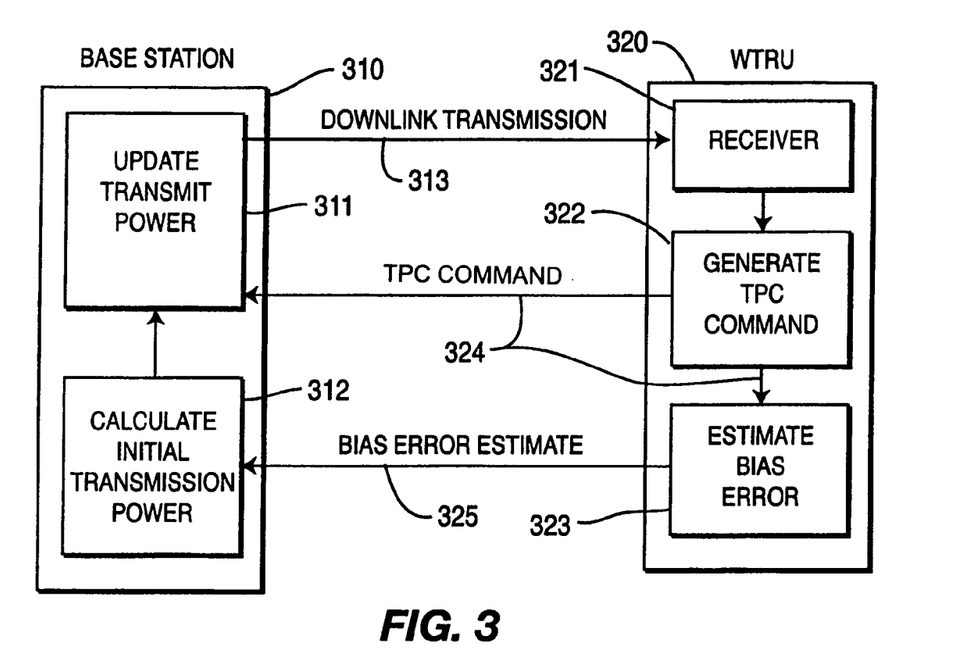
FIG. 3 shows a block diagram of the initial transmission power control at a base station with compensation for bias error estimated at a WTRU.
Figure 4:
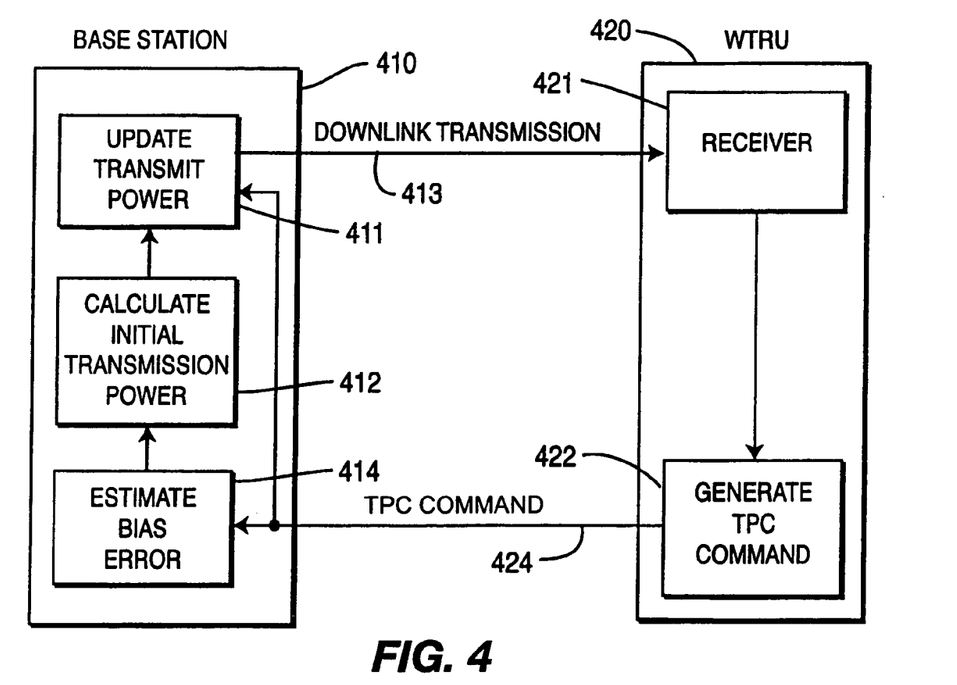
FIG. 4 shows an alternate embodiment of FIG. 3 wherein bias error estimation is performed at the base station.
Figure 5:
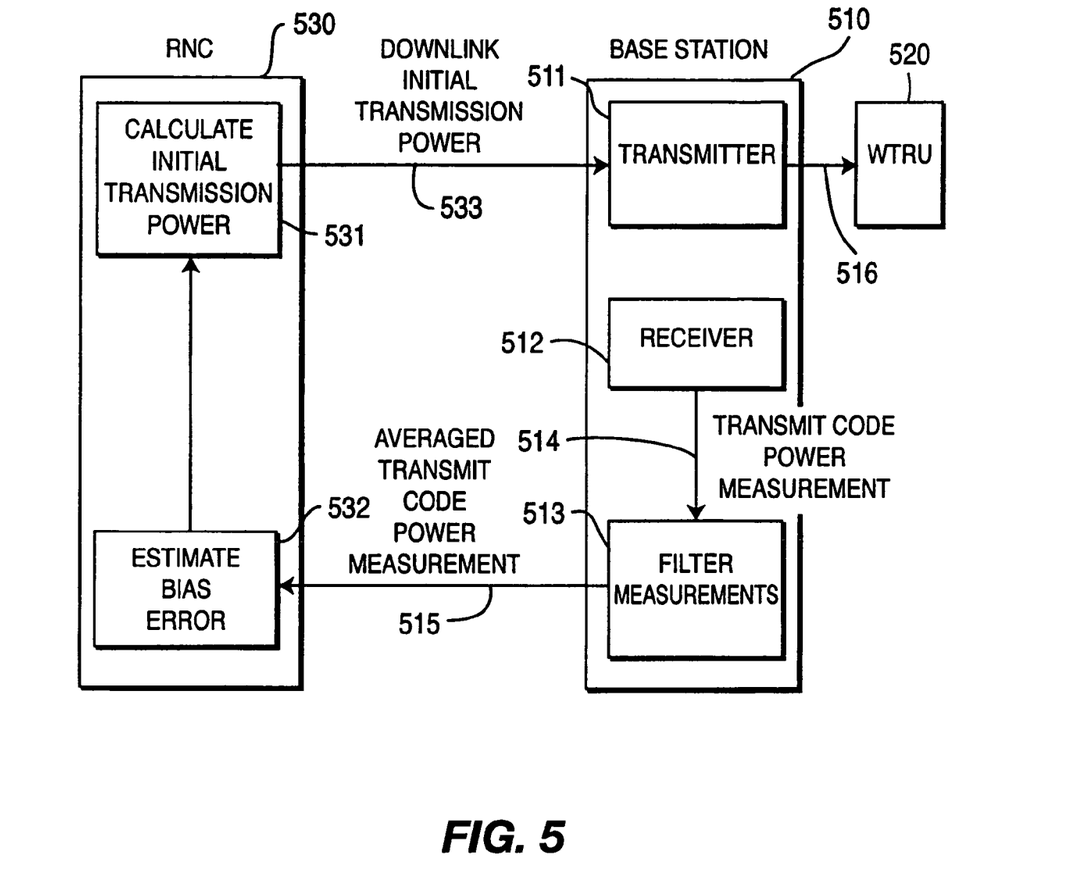
FIG. 5 shows a block diagram of the initial transmission power control at an RNC with compensation for bias error estimated at the RNC.

FIGS. 3-5 illustrate exemplary embodiments with respect to UTRAN entity implementations of the method 200. FIG. 3 shows a block diagram of the initial transmission power control at a base station 310 with compensation for bias error estimated at a WTRU 320. Downlink transmission 313 is sent by base station 310 to receiver 321 of WTRU 320. WTRU 320 then generates a TPC command 324 according to the inner loop power control process at power control module 322. TPC command 324 is sent to bias error estimator 323 which produces bias error estimate 325 that gets sent by uplink to initial transmission power unit 312 at the base station 310. The initial transmission power is calculated according to Equation 6. In accordance with method 200, the initial transmission power calculation will include the bias error compensation (i.e., according to Equation 7) if the Temp-DCH allocation is the second or later allocation. Power control unit 311 updates the transmit power based on TPC command 324 and the initial transmission power calculation from unit 312, including bias error compensation once enough Temp-DCH allocations have occurred (i.e., at least L allocations).

FIG. 4 shows an alternate embodiment of FIG. 1 wherein bias error estimation is performed at a base station 410 instead of at the WTRU. Base station 410 sends a downlink transmission 413 to WTRU 420 receiver 421. Power control unit 422 determines the appropriate TPC command 424 according to inner loop power control. TPC command 424 is sent via uplink to bias error estimator 414 at base station 410. Initial transmission power unit 412 calculates the initial transmission power according to Equation 6 and includes bias error according to Equation 7 if averaging period N is satisfied. Power control unit 411 updates the transmit power level for the next downlink transmission 413 according to the initial transmission power value from unit 412 and the TPC command 424.

FIG. 5 shows a block diagram of the initial transmission power control where bias error estimation and initial transmission power is determined at an RNC 530. Receiver 512 at base station 510 sends a transmit code power (TCP) measurement 514 to filter 513. Fast fading effects are mitigated at filter 513 by an averaging function, which produces an averaged TCP measurement 515. Bias error estimator 532 at RNC 530 receives averaged TCP measurement 515 and estimates bias error as the difference between the initial TCP and the measured TCP powering the first Temp-DCH allocation. Note that this bias error determination replaces the use of Equations 2, 3, 4 and 5 for method 200 performed by the base station. Power control unit 531 calculates the initial transmission power according to Equation 6 based on the bias error estimate from estimator 532. If a predetermined number of frames have elapsed, then the bias error estimate from estimator 532 is included in the initial transmission power calculation according to Equation 7. The initial transmission power value 533 is sent from RNC 530 to transmitter 511 of base station 510, which becomes the downlink transmission 516 to the WTRU 520.

What is claimed is:

1. A method of transmission power control for a transmitting wireless transmit receive unit (WTRU) that transmits successive data sets in a forward channel where the transmitting WTRU is configured to make forward channel power adjustments as a function of characteristics of the data sets as received over the forward channel, the method comprising:
   sequentially receiving successive data sets transmitted from the transmitting WTRU on the forward channel;
   successively computing transmit power control signals for the transmitting WTRU's forward channel power adjustments based on the characteristics of each of the data sets received on the forward channel;
   successively computing a bias error value based on the cumulative characteristics of the data set signals received on the forward channel; and
   in advance of each successive data set after the transmission of a first data set, adjusting forward channel power as a function of the most recently computed transmit power control signal and most recently computed bias error value.

2. The method of claim 1 wherein the transmitting WTRU is a network unit that transmits data sets on a downlink channel and the computing of transmit power control signals is performed by a receiving WTRU that receives the downlink channel.

3. The method of claim 2 wherein the transmitting WTRU computes the bias error values.

4. The method of claim 2 wherein the receiving WTRU computes the bias error values.

5. The method of claim 1 wherein the transmitting WTRU transmits user signals on an uplink channel and the computing of transmit power control signals is performed by a network unit that receives the uplink channel.

6. The method of claim 5 wherein the transmitting WTRU computes the bias error values.

7. The method of claim 5 wherein the receiving WTRU computes the bias error values.

8. The method of claim 1 in which closed loop transmission power control for the transmitting WTRU is implemented and the transmit power control signals are computed by a receiving WTRU that produces power step commands as a function of computed target Signal to Interference Ratios (SIRs), further comprising:
   transmitting the power step commands on a reverse channel by the receiving WTRU; and
   receiving the power step commands by the transmitting WTRU on the reverse channel and computing power adjustments for forward channel transmissions based on the received power step commands.

9. The method of claim 8 wherein the transmitting WTRU is a network unit that transmits data sets on a downlink channel and also computes the bias error values.

10. The method of claim 8 wherein the transmitting WTRU is a network unit that transmits data sets on a downlink channel and the receiving WTRU computes the bias error values and transmits the power step commands and the bias error values on an uplink channel.

11. The method of claim 8 wherein the method is implemented in a Universal Mobile Telecommunications System (UMTS) where the transmitting WTRU is configured as Node B and the receiving WTRU is configured as a mobile User Equipment (UE).

12. A receiving wireless transmit receive unit (WTRU) for implementing transmission power control for a transmitting WTRU that transmits successive data sets in a forward channel where the transmitting WTRU is configured to make forward channel power adjustments as a function of characteristics of the data sets as received over the forward channel, the receiving WTRU comprising:
   a receiver configured to sequentially receive successive data sets transmitted from the transmitting WTRU on the forward channel;
   a processor configured to successively compute transmit power control signals for the transmitting WTRU's forward channel power adjustments based on the characteristics of each of the data sets received on the forward channel;
   said processor configured to successively compute a bias error value based on the cumulative characteristics of the data set signals received on the forward channel; and
   a transmitter configured to transmit on a reverse channel the transmit power control signals for the transmitting WTRU's forward channel power adjustments and the bias error values to the transmitting WTRU to thereby enable the transmitting WTRU, in advance of each successive data set after the transmission of a first data set, to adjust forward channel power as a function of the most recently computed transmit power control signal and most recently computed bias error value.

13. The invention of claim 12 in which closed loop transmission power control for the transmitting WTRU is implemented wherein the receiving WTRU is configured to compute the transmit power control signals by producing power step commands as a function of computed target Signal to Interference Ratios (SIRs).

14. The invention of claim 13 wherein the receiving WTRU is configured as a User Equipment (UE) for use in a Universal Mobile Telecommunications System (UMTS) where the UE receiver is configured to receive the data signal sets on a down link channel and the UE transmitter is configured to transmit the power step commands and the bias error values on an uplink channel.

15. A transmitting wireless transmit receive unit (WTRU) having transmission power control comprising:
   a transmitter configured to transmit successive data sets in a forward channel;
   a processor associated with the transmitter configured to make forward channel power adjustments as a function of characteristics of the data sets as received over the forward channel;
   a receiver configured to successively receive on a reverse channel successively computed transmit power control signals for the transmitting WTRU's forward channel power adjustments based on the characteristics of each of the data sets received on the forward channel and successively computed bias error values based on the cumulative characteristics of the data set signals received on the forward channel; and
   the processor configured to adjust forward channel power as a function of the most recently received transmit power control signal and most recently received bias error value in advance of the transmission of each successive data set after the transmission of a first data set.

16. The invention of claim 15 in which closed loop transmission power control is implemented wherein the receiver is configured to successively receive power step commands produced as a function of computed target Signal to Interference Ratios (SIRs) as the computed transmit power control signals.

17. The invention of claim 16 wherein the transmitting WTRU is configured as a Node B for use in a Universal Mobile Telecommunications System (UMTS) where the Node B transmitter is configured to transmit the data signal sets on a down link channel and the Node B receiver is configured to receive the power step commands and the bias error values on an uplink channel.

18. A wireless communication system comprising a transmitting WTRU according to claim 15 and a receiving WTRU including:
   a receiver configured to sequentially receive successive data sets transmitted from the transmitting WTRU on the forward channel;
   a processor configured to successively compute transmit power control signals for the transmitting WTRU's forward channel power adjustments based on the characteristics of each of the data sets received on the forward channel;
   said processor configured to successively compute a bias error value based on the cumulative characteristics of the data set signals received on the forward channel; and
   a transmitter configured to transmit on a reverse channel the transmit power control signals for the transmitting WTRU's forward channel power adjustments and the bias error values to the transmitting WTRU.

19. The invention of claim 18 in which closed loop transmission power control for the transmitting WTRU is implemented wherein the receiving WTRU is configured to compute the transmit power control signals by producing power step commands as a function of computed target Signal to Interference Ratios (SIRs).

20. The invention of claim 19 where the wireless communication system is configured as a Universal Mobile Telecommunications System (UMTS) wherein the transmitting WTRU is configured as a Node B where the Node B transmitter is configured to transmit the data signal sets on a down link channel and the Node B receiver is configured to receive the power step commands and the bias error values on an uplink channel and the receiving WTRU is configured as a User Equipment (UE) where the UE receiver is configured to receive the data signal sets on the down link channel and the UE transmitter is configured to transmit the power step commands and the bias error values on the uplink channel.

21. A transmitting wireless transmit receive unit (WTRU) having transmission power control comprising:
a transmitter configured to transmit successive data sets in a forward channel;
a processor associated with the transmitter configured to make forward channel power adjustments as a function of characteristics of the data sets as received over the forward channel;
a receiver configured to successively receive on a reverse channel successively computed transmit power control signals for the transmitting WTRU's forward channel power adjustments based on the characteristics of each of the data sets received on the forward channel;
a bias error component configured to successively compute bias error values based on the successively received transmit power control signals; and
the processor configured to adjust forward channel power as a function of the most recently received transmit power control signal and most recently computed bias error value in advance of the transmission of each successive data set after the transmission of a first data set.

22. The invention of claim 21 in which closed loop transmission power control is implemented wherein the receiver is configured to successively receive power step commands produced as a function of computed target Signal to Interference Ratios (SIRs) as the computed transmit power control signals.

23. The invention of claim 22 wherein the transmitting WTRU is configured as a Node B for use in a Universal Mobile Telecommunications System (UMTS) where the Node B transmitter is configured to transmit the data signal sets on a down link channel and the Node B receiver is configured to receive the power step commands on an uplink channel.

24. The invention of claim 22 wherein the transmitting WTRU is configured as a UTRAN for use in a Universal Mobile Telecommunications System (UMTS) where the transmitter is disposed in a Node B and configured to transmit the data signal sets on a down link channel, the receiver is disposed in the Node B and configured to receive the power step commands on an uplink channel, and the bias error component is disposed in a Radio Network Controller (RNC) that controls the Node B.

25. A wireless communication system comprising a transmitting WTRU according to claim 21 and a receiving WTRU including:
a receiver configured to sequentially receive successive data sets transmitted from the transmitting WTRU on the forward channel;
a processor configured to successively compute transmit power control signals for the transmitting WTRU's forward channel power adjustments based on the characteristics of each of the data sets received on the forward channel; and
a transmitter configured to transmit on a reverse channel the transmit power control signals for the transmitting WTRU's forward channel power adjustments.

26. The invention of claim 25 in which closed loop transmission power control for the transmitting WTRU is implemented wherein the receiving WTRU is configured to compute the transmit power control signals by producing power step commands as a function of computed target Signal to Interference Ratios (SIRs).

27. The invention of claim 26 where the wireless communication system is configured as a Universal Mobile Telecommunications System (UMTS) wherein the transmitting WTRU is configured as a Node B where the Node B transmitter is configured to transmit the data signal sets on a down link channel and the Node B receiver is configured to receive the power step commands on an uplink channel and the receiving WTRU is configured as a User Equipment (UE) where the UE receiver is configured to receive the data signal sets on the down link channel and the UE transmitter is configured to transmit the power step commands on the uplink channel.

28. The invention of claim 26 where the wireless communication system is configured as a Universal Mobile Telecommunications System (UMTS) wherein the receiving WTRU is configured as a User Equipment (UE) where the UE receiver is configured to receive the data signal sets on the down link channel and the UE transmitter is configured to transmit the power step commands on the uplink channel and the transmitting WTRU is configured as a UTRAN where the UTRAN transmitter is disposed in a Node B and configured to transmit the data signal sets on a down link channel, the UTRAN receiver is disposed in the Node B and configured to receive the power step commands on an uplink channel, and the UTRAN bias error component is disposed in a Radio Network Controller (RNC) that controls the Node B.

* * * * *

UNITED STATES PATENT AND TRADEMARK OFFICE
CERTIFICATE OF CORRECTION

PATENT NO. : 7,274,947 B2
APPLICATION NO. : 10/721482
DATED : September 25, 2007
INVENTOR(S) : Koo et al.

It is certified that error appears in the above-identified patent and that said Letters Patent is hereby corrected as shown below:

At column 2, line 21, after the words "RNC that", delete "control" and insert therefor --controls--.

At column 2, line 29, after the word "also", delete "provides" and insert therefor --provide--.

At column 3, line 10, after the word "generated", insert --.--.

At column 6, line 15, after the word "system", delete "is illustrated".

At column 6, line 58, after the word "receiver", delete "16" and insert therefor --56--.

At column 7, line 38, after the word "station", delete "30" and insert therefor --50--.

At column 7, delete Equation 1, and insert therefor
--$P_{init}^{DL} = (P_{PCCPCH}^{tx} - P_{PCCPCH}^{rec}) + ISCP_{TS\#k}^{DL} + SIR^{DL} + CONSTANT$--.

At column 9, delete Equation 7, insert therefor
--$P_{init}^{DL,1}(j) = (P_{PCCPCH}^{tx} - P_{PCCPCH}^{rec}) + ISCP_{TS\#k}^{DL} + SIR^{DL} + CONSTANT + BE_{TOTAL\_AVG}(j-1)$--.

Signed and Sealed this

Twenty-seventh Day of May, 2008

JON W. DUDAS
*Director of the United States Patent and Trademark Office*